(12) United States Patent
Fuerst

(10) Patent No.: US 6,189,029 B1
(45) Date of Patent: *Feb. 13, 2001

(54) WEB SURVEY TOOL BUILDER AND RESULT COMPILER

(75) Inventor: Carol Fuerst, Fremont, CA (US)

(73) Assignee: Silicon Graphics, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/716,970

(22) Filed: Sep. 20, 1996

(51) Int. Cl.[7] .................................................. G06F 17/30

(52) U.S. Cl. ........................ 709/217; 707/104; 707/506; 707/507; 705/10

(58) Field of Search ........................ 395/200.34, 200.59, 395/200.33, 200.57, 200.49, 200.3, 200.31, 200.47; 364/242.94, 280, 282.1, 240.8, 284.4; 707/505, 506, 507, 104; 705/12, 10; 709/204, 205, 206, 207, 217, 218, 219

(56) References Cited

U.S. PATENT DOCUMENTS

| | | | |
|---|---|---|---|
| 5,056,086 | * 10/1991 | Libonati | 370/259 |
| 5,548,729 | * 8/1996 | Akiyoshi et al. | 395/200.16 |
| 5,704,029 | * 12/1997 | Wright, Jr. | 395/149 |
| 5,734,831 | * 3/1998 | Sanders | 395/200.53 |
| 5,737,592 | * 4/1998 | Nguyen et al. | 395/604 |
| 5,784,562 | * 7/1998 | Diener | 707/507 |
| 5,941,947 | * 8/1999 | Brown et al. | 709/225 |

OTHER PUBLICATIONS

Survey Said Internet HTML survey software, available at http://www.surveysaid.com.*
"Surveys Says" PC Week, Apr. 22, 1996 v13 n16 pE5(1).*
WebsiteSurveys "Website Research" White paper, Internet http://www.ws2.com/HowToDo.html, 1997.*
Mello, John P, "Survey Software automates electronic polling", PC World, May 1996 v14 n5 p78.*
Powell, Timothy "Do–it–yourself survey software" Marketing Computers, Feb. 1996 v16 n2 p30.*

* cited by examiner

Primary Examiner—Dung C. Dinh
(74) Attorney, Agent, or Firm—Wagner, Murabito & Hao LLP

(57) ABSTRACT

The present invention relates to a software tool that permits creation of electronic surveys and the automatic collection and tabulation of survey results corresponding to user responses. Using the tool, a survey is automatically created and posted at a Web site address. With a Web client, or browser, computer users access the URL and complete the survey via the Web. Survey results are collected in a relational database as each user completes the survey. Thereafter, statistical tools or other analytical software applications may be applied to data mine the tabulated results.

In another preferred embodiment, the software tool is utilized to access remote servers running relational databases from an internet computer via the Web. Advantageously, the computer does not require the computational processor power or memory (i.e. system memory or disk storage capacity) normally required to load and operate the applicable relational database application software.

25 Claims, 16 Drawing Sheets

| MULTICHOICE | | |
|---|---|---|
| QUESTIONID | VARCHAR(32) | NULL |
| CHOICEID | VARCHAR(32) | NULL |
| STRING | VARCHAR(255) | NULL |

FIG. 5

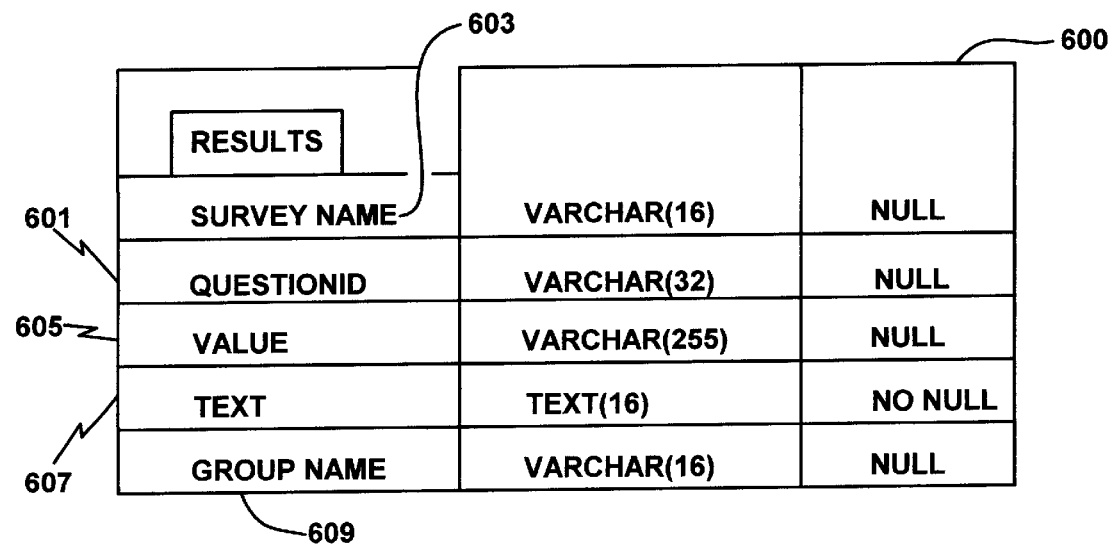

| RESULTS | | |
|---|---|---|
| SURVEY NAME | VARCHAR(16) | NULL |
| QUESTIONID | VARCHAR(32) | NULL |
| VALUE | VARCHAR(255) | NULL |
| TEXT | TEXT(16) | NO NULL |
| GROUP NAME | VARCHAR(16) | NULL |

FIG. 6

WEB SURVEY TOOL BUILDER AND RESULT COMPILER

TECHNICAL FIELD

This invention relates to an internet software tool. More particularly, the present invention relates to a Web survey tool that utilizes the distributed access afforded by the internet or local area networks (LANs) to collect and tabulate user answers to survey questions or afford remote modification of relational database tables.

BACKGROUND ART

The internet is a global collection of computer networks that provides individual users the ability to access internet services including the world wide web (Web). With internet access, individual users may, among other functions, send electronic mail (also known as "email") to other users and remotely login to high power computers known as servers connected to the internet. Connecting to the internet requires a modem, a software communication package and a personal computer system as is well known in the art.

The Web is a collection of Hypertext Transfer Protocol (HTTP) servers that incorporate text, graphics, audio files, video and information in other formats. Web browsers such as NETSCAPE NAVIGATOR enable users to locate and connect to a Web page. "NETSCAPE" and "NAVIGATOR" are claimed to be trademarks of Netscape Communications Corporation of Mountain View, Calif. Before the Web page may be located however, it must first be created in Hypertext Markup Language (HTML), which is the standard language of the Web, and posted on a server, a process that costs several hundreds of dollars and consumes several hours of programming effort. Such costs are usually tolerable if the information contained on the page does not change over a long period of time or if only a few pages need are to be created. However, if the information is dynamic, the costs associated with updating the information can quickly escalate as can the time required to update the information. Similarly, if multiple pages need to be created, the costs associated with the creation will quickly increase.

If the Web page is intended to perform interactive functions, such as survey a class of users on a selected topic, a webmaster, that is an individual responsible for maintaining the computer server and the web pages stored in the server's memory, must develop Perl scripts for each web page, a slow and time consuming task. Further, the webmaster must also develop a relational database comprising a plurality of tables and interface the tables with the scripts to collect users responses, another time consuming task. Accordingly, if several surveys are contemplated, it is desirable to create a software tool that eliminates significant involvement by the webmaster in creating and posting the surveys.

It would also be desirable to permit remote users the ability to access database information over the internet so as to facilitate commercial transactions or dissemination of information via dynamic Web pages. For example, airline reservations, banking transactions and corporate or government database transactions over the internet require the user to have restricted access to large data sets which are often configured as a relational database.

While current internet technology permits the user to transfer sets of data from the Web server to their computer, the user's computer must have sufficient computer processing power and data storage capacity to store and manipulate the information. In addition, the user must often times download entire files when only a small amount of information is required. Such transfers are time consuming and decrease the available bandwidth of the internet. Further, if the user does not have the proper application software, including the proper version of software, the downloaded file may not be useable. In many situations, the owner of the database may not desire users to have complete copies of the database. Accordingly, such owners may simply provide a limited subset of information to a Web page in the hopes that such information satisfies the needs of a majority of users.

Unfortunately, it is impractical to design a permanent Web page with data that is constantly changing due to the difficulty in time and effort that would be necessary to maintain an up-to-date Web page. Further, it is desirable to ensure that users will have access to the data sets while preventing unauthorized modification of the database.

DISCLOSURE OF THE INVENTION

The present invention provides a software tool which permits creation of surveys and the automatic collection and tabulation of survey results corresponding to user responses. Using the tool, a survey can be easily created by authorized groups or individuals without involvement by a webmaster. Once created, the survey is posted at a Web site address and the Universal Resource Locators (URL) is sent to one or a selected group of computer users by electronic mail or broadcast by other means, such as, for example, by advertisements or by telephone. With a Web client, or browser, users may access the survey page at the URL and complete the survey over the Web.

Surveys are constructed by a creator entering the text comprising the survey questions. The form of the questions may include at least seven different question types such as, radio (e.g., a multiple choice question with a single answer), multiple choice with multiple answers, input (with a defined input field size and type) short answer text (with a defined field length), scaled response (e.g., answer selected from among five options such as "strongly disagree," "disagree," "neutral," "agree," "strongly agree"), Yes/No, or left/right, text areas with various number of columns and rows, and the like.

Survey results are collected in a relational database as each user completes the survey. Thereafter, the survey creator can access the results and apply statistical tools or other analytical software applications to data mine the tabulated results.

By way of example, if a corporate work group desires to find out how many employees are satisfied with the company's medical plan, a survey containing specific questions regarding employee use and experiences in dealing with the plan's administrators may be generated by a creator and posted to the Web page. Advantageously, the creator is not required to understand the technical requirements of creating a Web page.

By broadcasting a company-wide electronic mail message, the Web address and notice of the availability of the survey is transmitted to the intended survey user. Responses are tabulated and used, for example, to identify under-used benefits, inefficiencies in the plan's administration, or to determine whether the plan is meeting the needs of employees and their families.

By way of further example, if a customer service work group is interested in customer feedback on, for example, the company's current products, a survey containing specific questions for the company's products may be created and posted to a Web page. Customers may be informed of the availability of the survey by electronic mailing, product updates that are mailed via the postal service or through other readily apparent means.

In another preferred embodiment, the software tool may be utilized to access, via the Web, remote servers running relational databases. Rather than creating a series of survey questions designed to merely collect and tabulate information, the Web page contains questions that will permit the user to access selected data sets comprising a relational database and obtain information therefrom. Alternatively, the user may be permitted to modify one or more of the data sets comprising the database based on information supplied by the user to complete a transaction.

For example, the user may be able to obtain airline schedule and fare information by accessing the Web page for a particular airline once the URL is known or located. After establishing connection, a series of questions may be presented to the user which may include, by way of example, "Do you wish to obtain fare quotations for domestic or international flights?" Rather than merely tabulating the response, the present invention provides the necessary intelligence, based on the answers given by the user to the first series of questions, to select a second series of questions from a decision tree comprising a plurality of available surveys. Specifically, in response to the user's input to the above question, the user may be presented with a second series of questions designed to determine the origination city and the destination city together with the date, time and class of travel as well as any other pertinent information that the airline may require to prepare a price quotation. Based on the user's input a price quotation may be prepared and displayed. If desired, the present invention may also conclude a transaction by requesting credit card information and updating appropriate data sets contained in the database to document the transaction. Advantageously, the user's computer does not require the computational processor power or memory (i.e. system memory or disk storage capacity) normally required to load and operate the applicable relational database application.

BRIEF DESCRIPTION OF THE DRAWINGS

The accompanying drawings, which are incorporated in and form a part of this specification, illustrate embodiments of the invention and, together with the description, serve to explain the principles of the invention:

Figure 5:
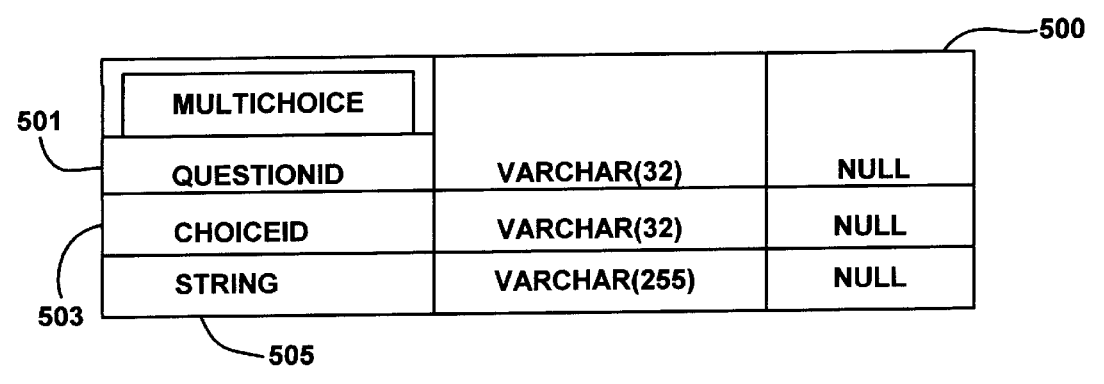

FIGS. 2–6 represent the SQL view of tables set up in a relational database.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

One preferred embodiment of the present invention allows a creator, who may be unskilled in creating Web pages, to easily create a survey comprising a series of questions and post the survey on a Web page. Users of a Web browser may then access the survey to answer the questions. The original HTML for the Web document is not modified and the present invention can operate with any HTML server. HTML stands for "hypertext markup language" and is the standard language of the Web. Similarly, the present invention does not require that any modification be made to a HTML browser and the present invention can operate with any browser.

Figure 1:
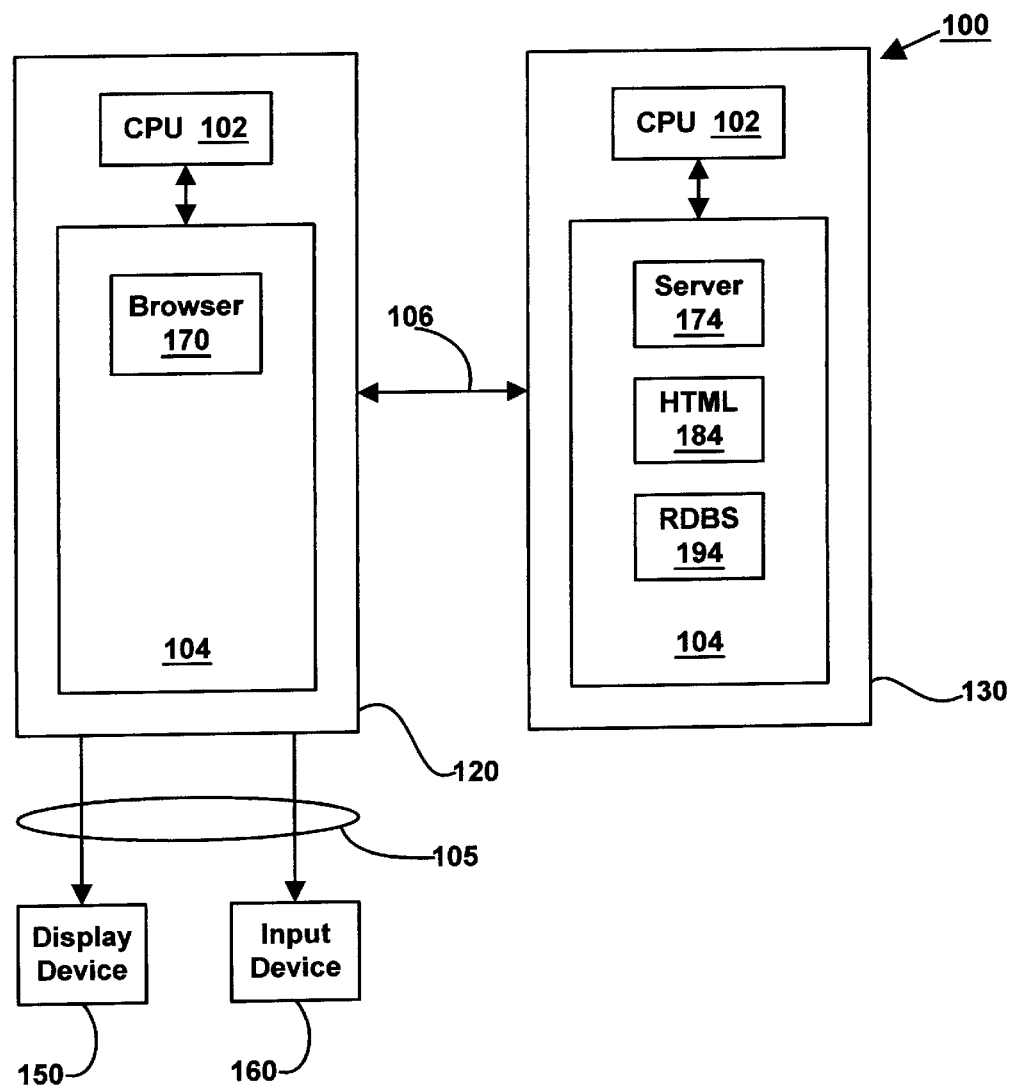
FIG. 1 is a schematic diagram of a representative networked computer system.

FIG. 1 is a block diagram of a computer system 100 in accordance with the present invention. Computer system 100 includes a computer 120, and a computer 130. Computers 120 and 130 are connected by network connection 106, such as internet connection or the connection of a local area network or LAN.

Computers 120 and 130 each include a CPU 102 and a memory 104. Computer 120 also includes input/output lines 105, connected to a display device 150 and an input device 160. Display device 150 is, e.g., a display terminal, and input device is, for example, a keyboard and/or a mouse. It will be understood by persons of ordinary skills in the art that computer system 100 can also include numerous elements not shown in FIG. 1 for the sake of clarity, such as disk drives, additional keyboards, additional output lines, additional network connections, additional memory, additional CPUs, etc.

Memory 104 of computer 120 includes a computer program called a "browser" 170. Memory 104 of computer 130 includes a computer program called a "server" 174, data 184 representing HTML for a Web document and a relational database 194 such as Oracle, available from Oracle, Corp. of Redwood City, Calif., Sybase, available from Sybase, Inc. of Berkeley, Calif., Access, available from Microsoft Corporation, Redmond, Wash. and the like. "Oracle " "Sybase" and "Access" are claimed to be trademarks of the respective owner. In the preferred embodiment, SQL (structured query language) is used to query, update and manage the relational database. A person of ordinary skill in the art will understand that memories 104 may also contain additional information, such as application programs, network communication programs (e.g., the TCP/IP protocol suite), operating systems, data, etc., which are not shown in the figure for the sake of clarity. A preferred embodiment of the present invention executes under the IRIX operating system, available from Silicon Graphics, Incorporated of Mountain View, Calif.

It will be understood that, although two separate computers are shown, the present invention can also be implemented so that the browser and server are running on the same machine, or on some combination of multiple machines. In the described embodiment, the browser preferably is the "NAVIGATOR," versions 1.1 or 2.0, available from Netscape Communications. The present invention will also operate with various other HTML-compatible browsers. Also, in the described embodiment, the server is a Sybase server available from Sybase, Inc. of Berkeley, Calif. and the relational database 194 includes a plurality of Sybase tables, described in greater detail below, and the SQL programming language, Perl. As will be appreciated by one skilled in the art, it may be necessary to adjust the code of the Sybase server and/or Perl scripts to ensure compatibility with the particular computer 130.

Figure 2:
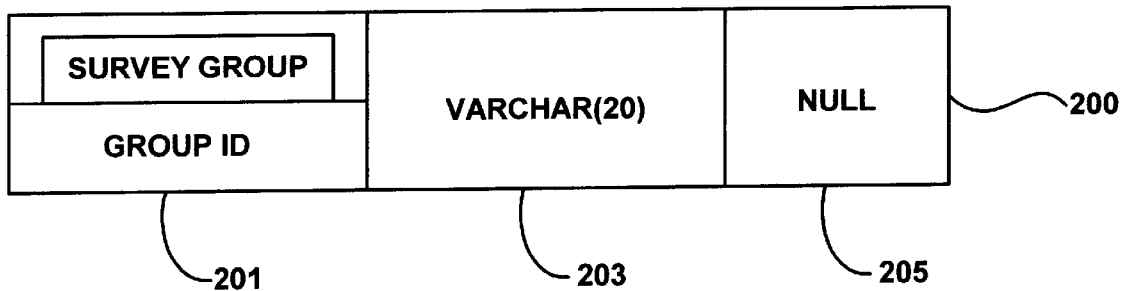

When installing the present invention on computer 130, the webmaster will generate a list of creators authorized to create and post a survey. This provides the webmaster a degree of control to prevent unlimited proliferation of surveys. In the preferred embodiment, the webmaster creates an SQL table 200, Survey Group, as shown in FIG. 2. Table 200 contains the information for identifying valid authorized groups. In table 200, the group identification is a twenty character entry as shown in field 203. As indicated in field 205, null entries are permitted. The webmaster is responsible for assigning each group (or individual) a group identification. The primary purpose of maintaining survey group table 200 is to maintain control over the number and identification of authorized creators and limit access to survey results to the creator.

Typically, if a member of a company's work group (such as the sales and marketing group, the human resource group, the training or customer service group by way of example) needs to obtain input from a population of users on specific subjects, the webmaster will assign the work group a private identification number or password. The password may be shared by one or more members of the work group.

Referring now to FIGS. 3–6, the SQL tables required to build a survey are shown. Specifically, table 300 is used to assign each question in the survey a unique question identification number, QID. As indicated in fields 301–305, the identification number is an integer and null characters are not permitted.

Table 400, stores each question of the survey together with its QID which is stored in field 401. The QID is populated from the identification number obtained from table 300. The actual text portion of the question is stored in field 403 which may be, in one embodiment, a 255 character field. The question type, for example, multiple choice, radio, text, etc., is stored in field 405.

If a particular question has multiple choices, all of the choices are stored in table 500. For example, if the question has four possible answers, A, B, C, and D, each answer is assigned an identification number, choiceID, which is defined in field 501 and the text portion of the answer is defined by field 503. Table 500 is linked to the Survey Question table 400 by the QID stored in fields 401 and 501 of tables 400 and 500, respectively. The QID is used by the survey tool to index into the Mult Choice table 500. Field 505 is used to store the text portion of each of the choices.

By way of example, if question 101 is a multiple choice question "What is your favorite professional baseball team?", field 501 will contain the QID, field 503 will contain twenty-eight possible choices (one for each of the major league baseball teams) and field 505 will contain the corresponding text for each of the choices.

Results submitted by the user are stored in table 600 where fields 603, 601 and 609 define the survey name, QID and the group authorized to review the survey results, respectively. Field 605 stores the value of the response. If the response is a text answer, text is first stored in field 605 with excess text overflowing into the text field 607.

In the embodiment described herein, tables 200–600 are representative of the preferred embodiment, however, it will be apparent to one skilled in the art that additional tables may be created or the described tables 200–600 may be altered in several different ways by the webmaster. For example, additional fields may be added to one, some or all of tables 200–600, fields can be altered as to data type or field size as required by the application. Further, additional tables may be included or unnecessary tables deleted. In such a case, changes will have to be reflected in associated PERL scripts.

Figure 7:
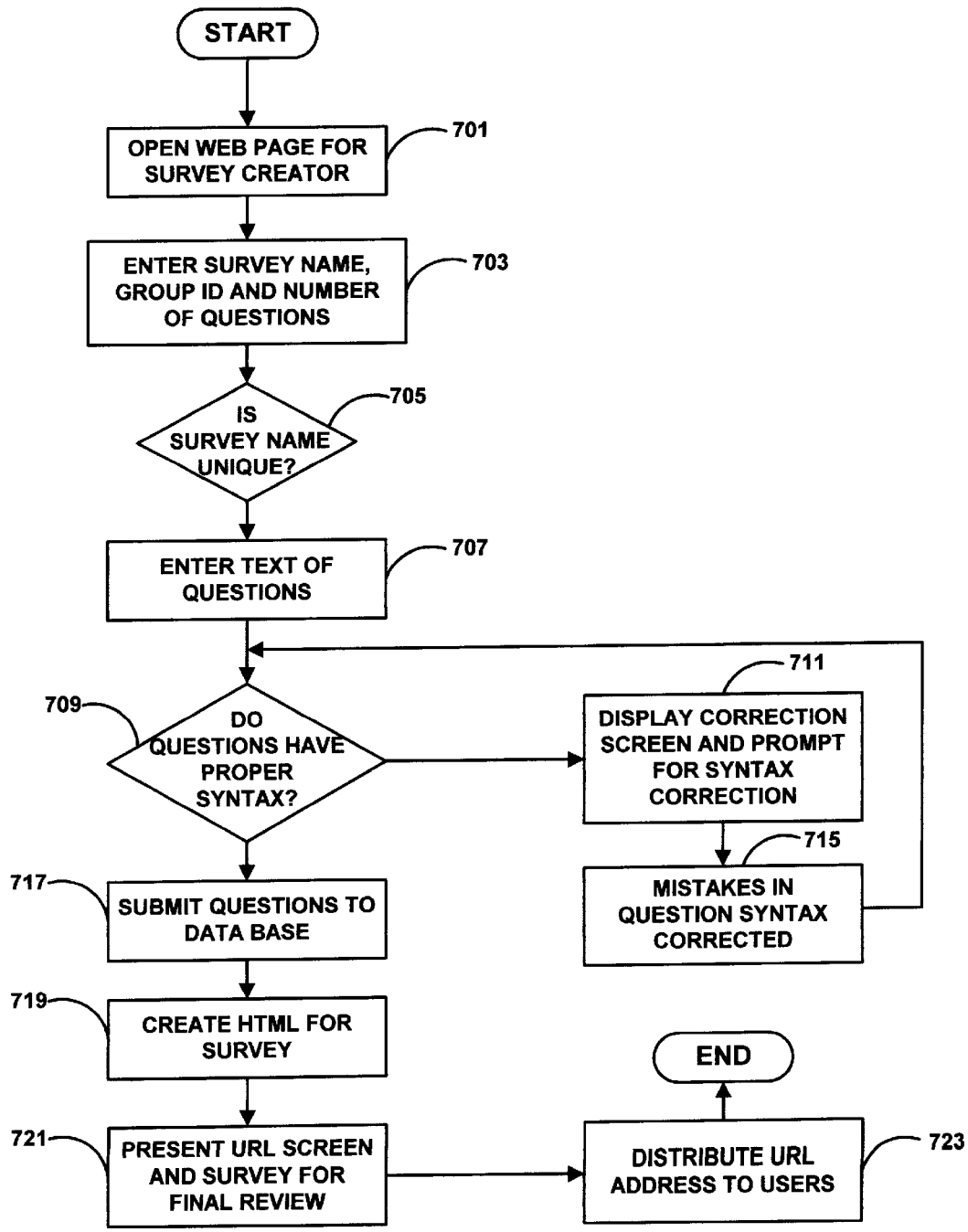
FIG. 7 illustrates a flow diagram for developing a survey Web page.
Figure 8:
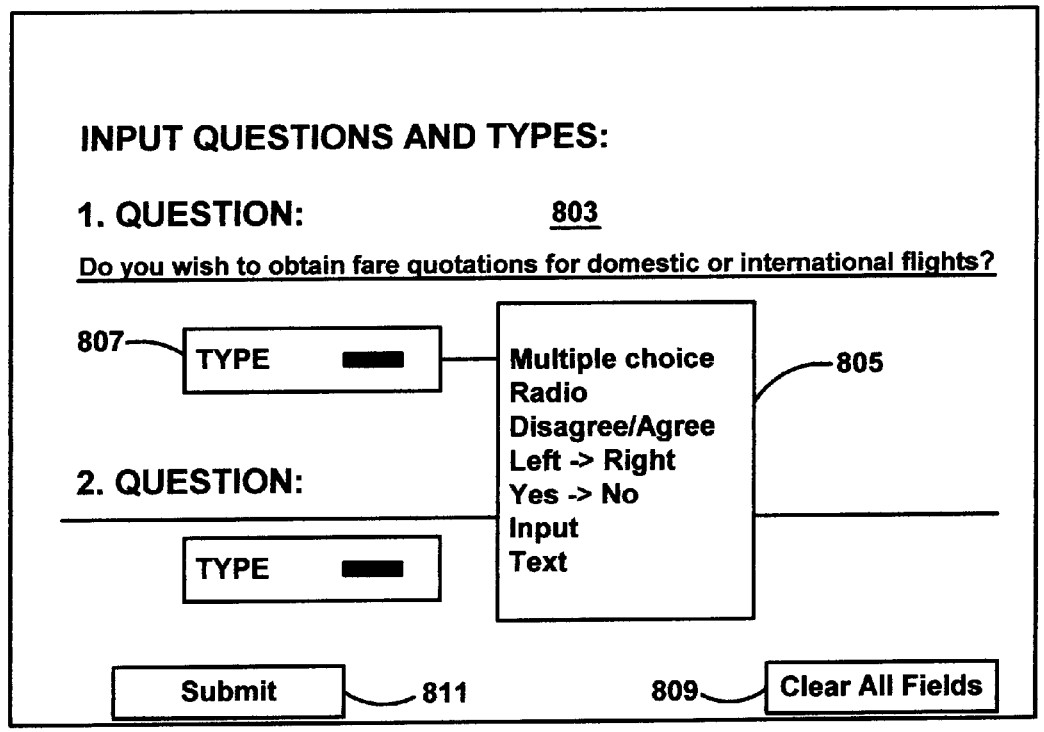
FIG. 8 illustrates a screen display for entering survey questions.
Figure 9:
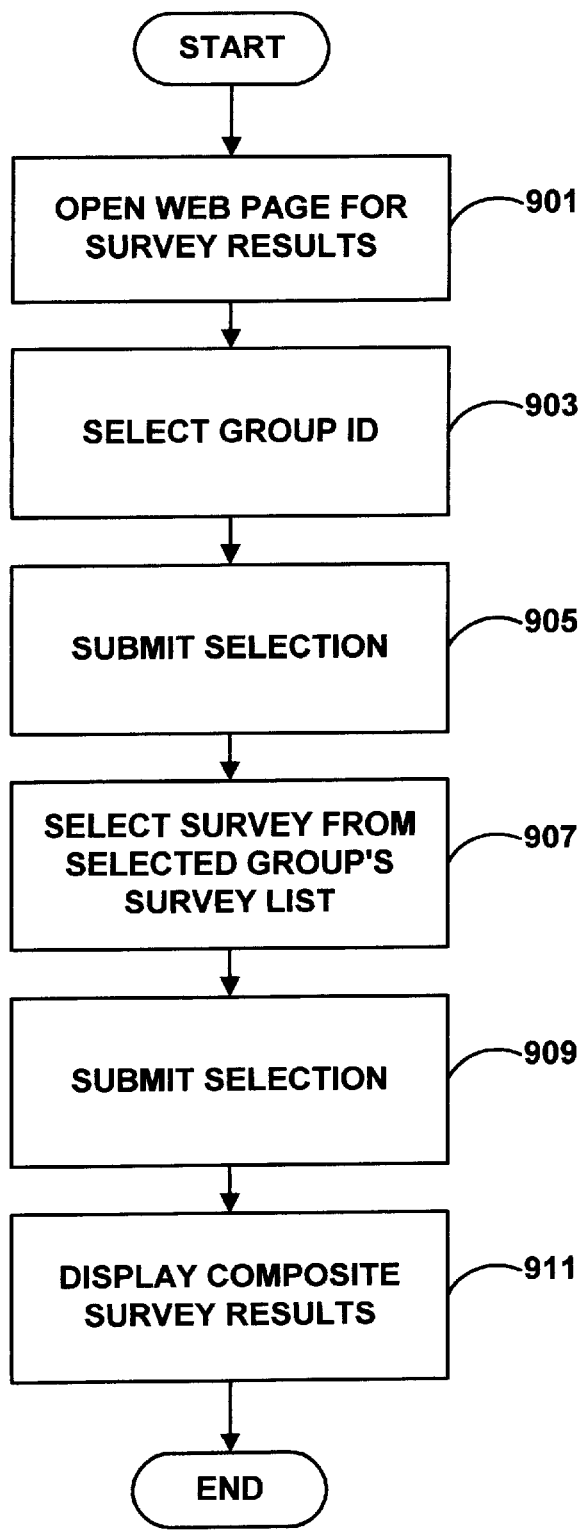
FIG. 9 illustrates a flow diagram for obtaining and viewing composite survey results.

Referring now to FIGS. 7, 8 and 9, the creation and response to a survey process is shown in greater detail. As shown in FIG. 7, a Web page is opened for the survey creator, as shown in block 701. The creator is prompted for a requested name for the survey, the survey ID, a group ID and the number of questions that will comprise the survey to initiate the process of creating a survey. The name of the survey is checked to verify that the name is unique and does not conflict with another named survey, as shown in block 705. If a file is found to exist in the selected directory, the creator must select a different survey name. The creator is also prompted to identify the number of questions in the survey.

The creator then proceeds to construct a survey by entering the text of the questions, block 707 in accordance with the software tool's allowable question types and syntax rules. In the preferred embodiment, question types include up to seven different types such as: 1) radio (e.g., multiple choice question with a single answer); 2) multiple choice with multiple answers; 3) input (with a defined input field size and type); 4) short answer text (with a defined number of rows and columns for accepting the answer); 5) scaled response (e.g., answer selected from among five options such as "strongly disagree," "disagree," "neutral," "agree," "strongly agree"); 6) Yes/No; or 7) "left/right" (e.g. two pieces of information which define the possible spectrum of answers are provided and the response indicates the relative degree of agreement with one or the other possible answers). One skilled in the art will appreciate that other question types are possible and question types are not to be limited to the above examples.

FIG. 8 represents a question input display screen 801 of the present invention as displayed on display device 150 (see FIG. 1). Specifically, question 1 has been entered, as indicated at 803, and a drop down menu 805 comprising the form of the answer to the question is presented when the Type Button 807 is selected by the user. Once the form of the answer is selected, the creator inputs answer selections, if necessary. By way of example, one possible answer form for the question set forth at 803 might be a multiple choice question with two choices and a single allowed answer. Clear Screen Button 809 may be selected at any time to clear the fields. After all questions have been constructed, the creator submits the survey by clicking a Submit Button 811.

With reference again to FIG. 7, the survey tool of the present invention performs a rules check to ensure that all questions have been properly constructed with correct syntax as shown in block 709. Specifically, if a multiple choice question has four possible choices, the check verifies that all four choices have been entered. If a question requires a text block to be allocated, the rules check verifies that the block has been properly defined. If syntax errors are detected, the creator is prompted, at blocks 713 and 715, to enter the necessary corrections.

Figure 3:
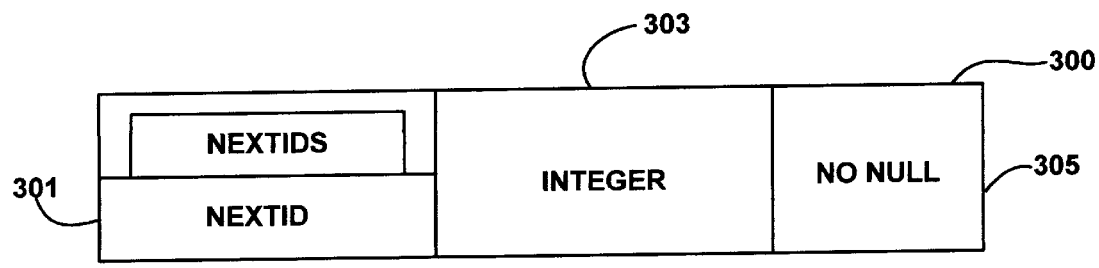
Figure 4:
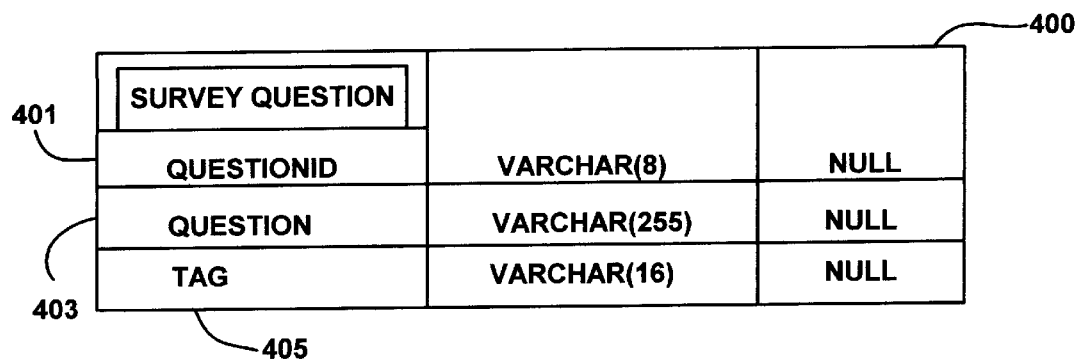

Once all questions are in proper form, the survey questions are submitted to the data base, as indicated at block 717. The survey tool assigns a unique QID (QID) to each question. The QID is obtained from a "Next ID" table 300 which is shown in FIG. 3. The QID is stored in field 401 in the Survey Question table 400 shown in FIG. 4 and matches it with the question by storing the text portion of the question in field 403. A tag that identifies the question type is stored in field 405 of Survey Question table 400.

Referring back to FIG. 7, as shown in block 719, a HTML Web page specific to the survey is created and stored in memory 104 of computer 130. In the preferred embodiment, the creation of the Web page is generated by Perl scripts as will be discussed below in greater detail. The Web page (also known as the "URL") is displayed for final review by the creator, block 721. The creator may thereafter distribute the URL address to selected users, block 723.

In general, the creator of the survey may determine the composition of individuals or groups, that is the user population, that will be provided access to answer the survey questions. In the preferred embodiment, each user is provided the Universal Resource Locator or URL address of the Web page by electronic mail or other means of correspondence although it will be readily apparent that other means of announcing the URL and controlling access thereto are available and are not discussed herein.

Referring back to FIG. 1, users may log into the Web page, utilizing computer 120, and standard browser program 170 executing thereon, to request, retrieve, and display the Web page. Each request by computer 120 for retrieval of the Web page is formulated in accordance with the network protocol, e.g., HTTP, and transmitted by browser 170 across network communications link 106 to computer 130. Computer 130 receives HTTP requests and processes them using HTTP server software, e.g., server software 174. Accordingly, the user may respond to the survey at any convenient time from computer 120. As one skilled in the art will appreciate, it is also possible to include a "Web-jumper" with the electronic mail message to take the user directly from the electronic mail message into the Web page containing the survey.

Referring now again to FIG. 6, upon receipt of the Web page, the user ay answer the questions and submit the results back to the Web page. The results of each question in the survey is stored in table 600, Results, together with the survey group identification, the survey name and the QID. All numeric valued questions and all short answer text questions are stored in the value field 605 (FIG. 6). Longer text answers in excess of 255 characters are stored in field 607. Within table 600, the answer to each question is stored as a line item.

Referring now to FIG. 9, when the survey creator desires to obtain the results of the survey, the creator will enter the appropriate group ID to obtain the list of surveys that the creator can view or access. The desired survey is then accessed and the results are viewable on a question by question basis with the results automatically tabulated as a composite result. Specifically, the creator opens the Web page and enters the survey group identification number, blocks 901–903 and submits the information. Based on the submission, a list of available surveys available to that group are presented, block 907, and the selected survey is then submitted by the creator, block 909. The survey tool of the present invention generates a composite survey result summary, block 911.

As the results are viewed, the creator may determine, for example, the average of a particular QID, how many actual survey submissions were returned by the users, what was the percentage of responses for each choice, or what is the percentage of users who submitted an answer for QID. Null answers to survey questions are discarded prior to display of the survey results so that the creator need not expend effort or time viewing such null answers. If viewing of composite results are not required or desired, all of the survey results may also be transferred to a flat file such as a statistical program, a spreadsheet or word processing program for further data manipulation, mining or reporting functions.

Figure 10:
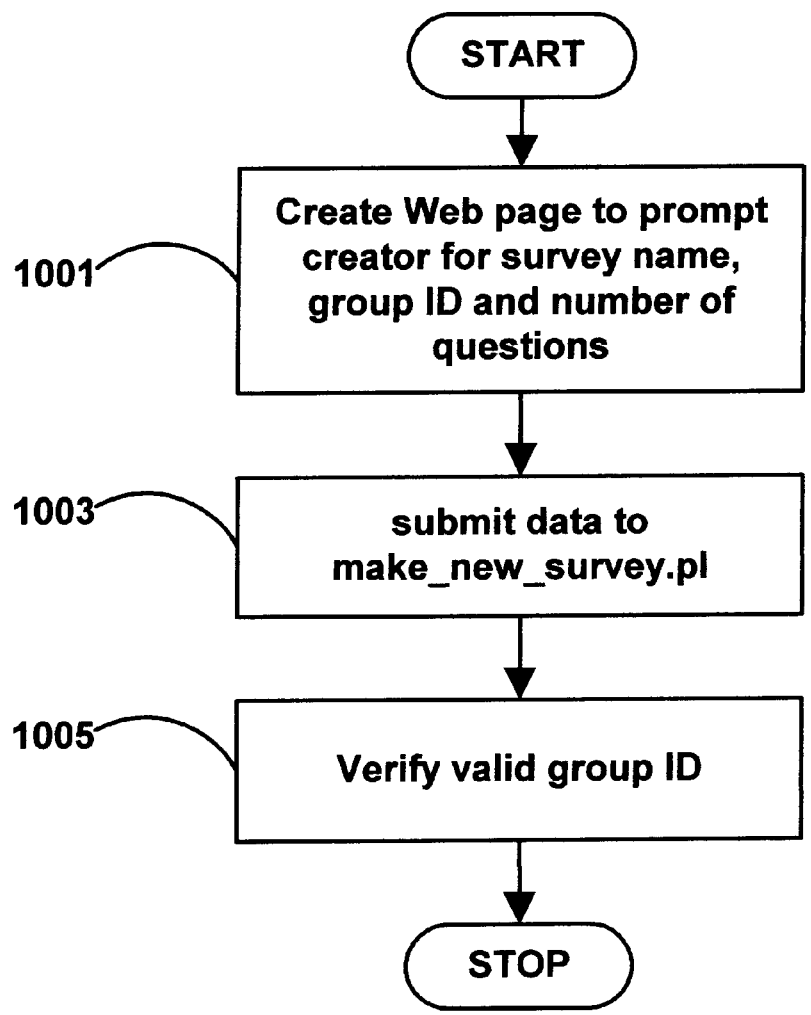
FIGS. 10–15 illustrate flow diagrams for Perl scripts interfacing the survey Web page to the relational database tables.

The creation of the Web page is generated by Perl scripts in the preferred embodiment. As shown in FIG. 10, a first script creates a Web page that prompts the creator for group identification, a survey name and the number of questions in the survey, block 1001. The script accepts responses from the creator and verifies that the group identification is valid. The survey name and number of questions are passed to a second script for creating new surveys, block 1005.

Figure 11:
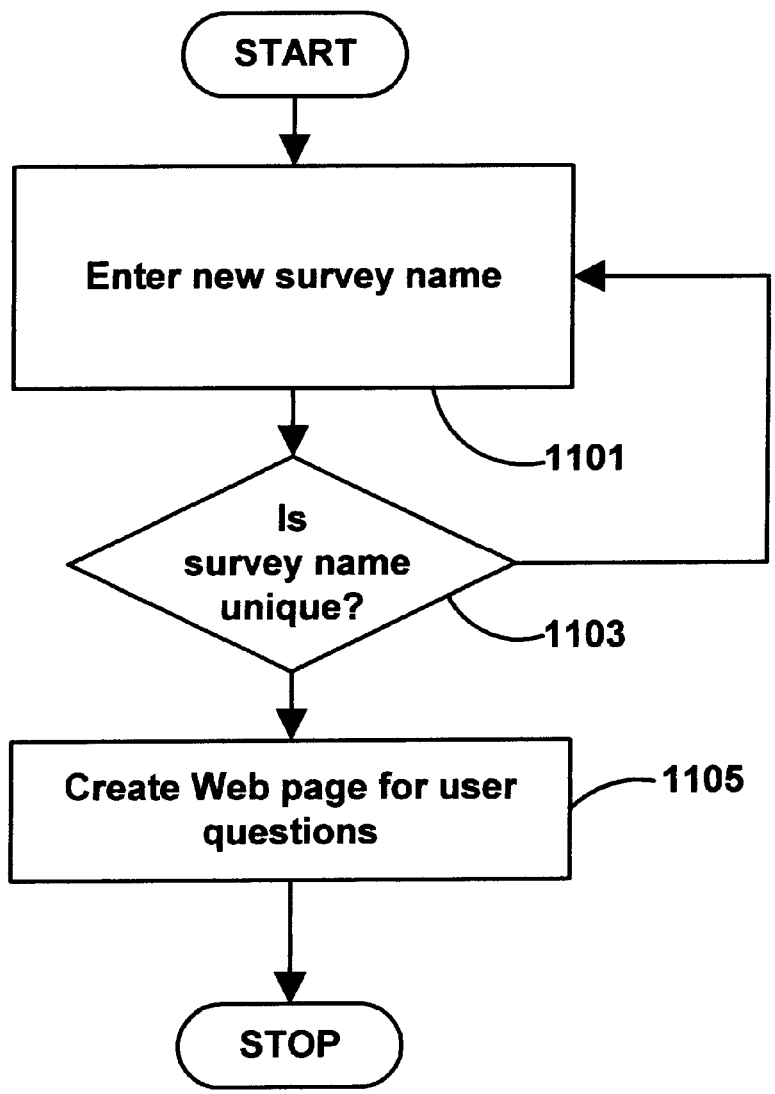

A flow diagram of a second script is shown in FIG. 11 where the survey name is first verified, blocks 1101 and 1103. The script accesses a directory where survey names are stored and compares the current survey name with existing names of surveys stored in the directory. If the survey name is valid, that is unique, the script creates a web page for the selected number of questions, block 1105.

Figure 12:
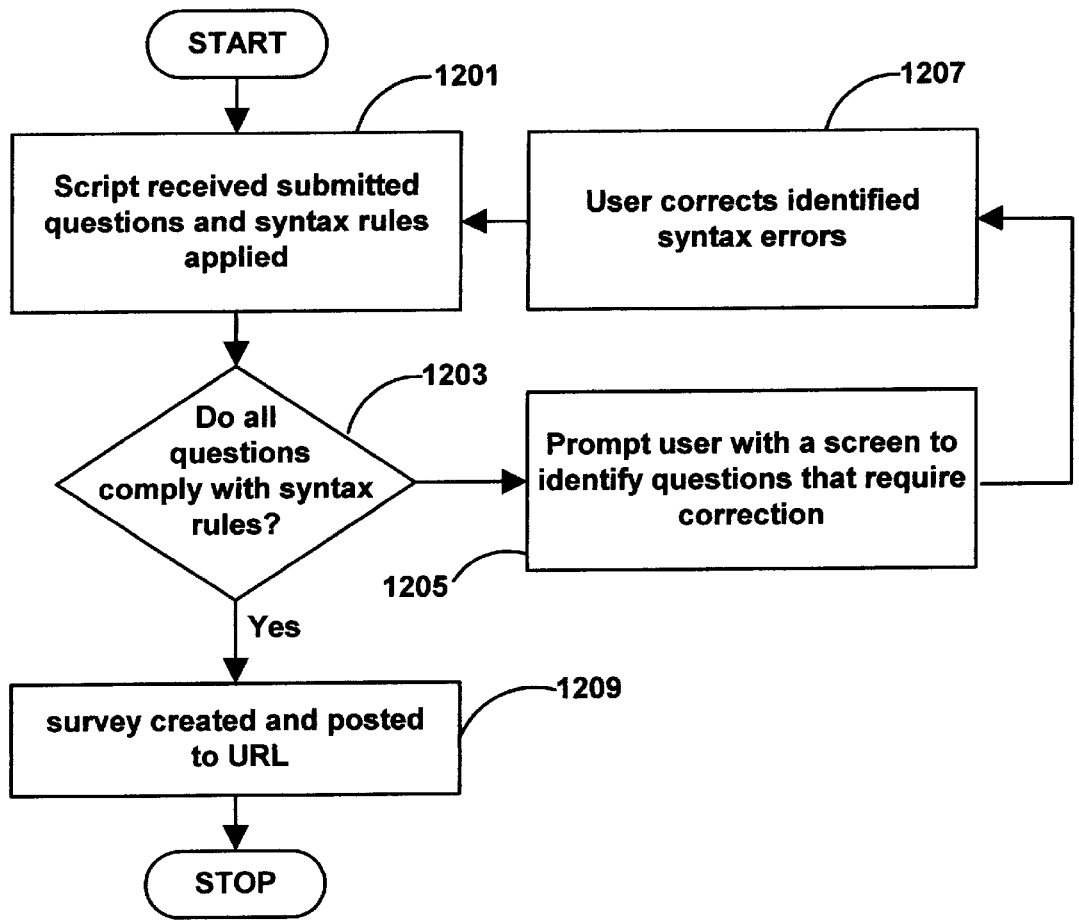

A third script is used to verify the questions submitted by the creator. Specifically, as shown in the flow diagram of FIG. 12, the script receives the questions when the creator toggles the submit screen button 811 (FIG. 8) and performs a rules check to ensure the proper syntax for each question, block 1201. For example, the proper syntax for a multiple choice question requires that the text of the question to be entered followed by a number, n, which represents the number of choices that will be attached to the question. A delimiter, such as a vertical bar ("|") brackets the number of choices, n. The text of each of the choices is then entered with each choice separated from other choices by a second delimiter (for example, a pound sign "#"). Question syntax is summarized in Table 1 for each of the questions types. As will be appreciated by one skilled in the art, answers for the Disagree/Agree and Yes/No question types are automatically provided by the script.

TABLE 1

| | |
|---|---|
| multiple choice - multiple answer | Text of question \|n\| Choice1#Choice2#. . . #Choicen |
| multiple choice - one answer | Text of question \|n\| Choice1#Choice2#. . . #Choicen |
| Disagree/Agree | Text of question |
| Left/Right | Text of question \| Left side \| Right side |
| Yes/No | Text of question |
| Input | Text of question \| Size of response box |
| Text Response | Text of question \| Rows in text box \| Columns in text |

If one or more questions do not comply with the syntax rules, block 1203, a screen is created to display the improper formulated question, block 1205, and corrections submitted by the creator are resubmitted to the rules check, block 1207. If all questions are in proper form, a web page is created, a URL address is defined and the page is loaded into memory 104 of computer 130 (FIG. 1), block 1209. Accordingly, once the webmaster sets up the script environment, the creator need only enter the desired questions without actual knowledge of the system, programming language or how the survey is generated.

Figure 13:
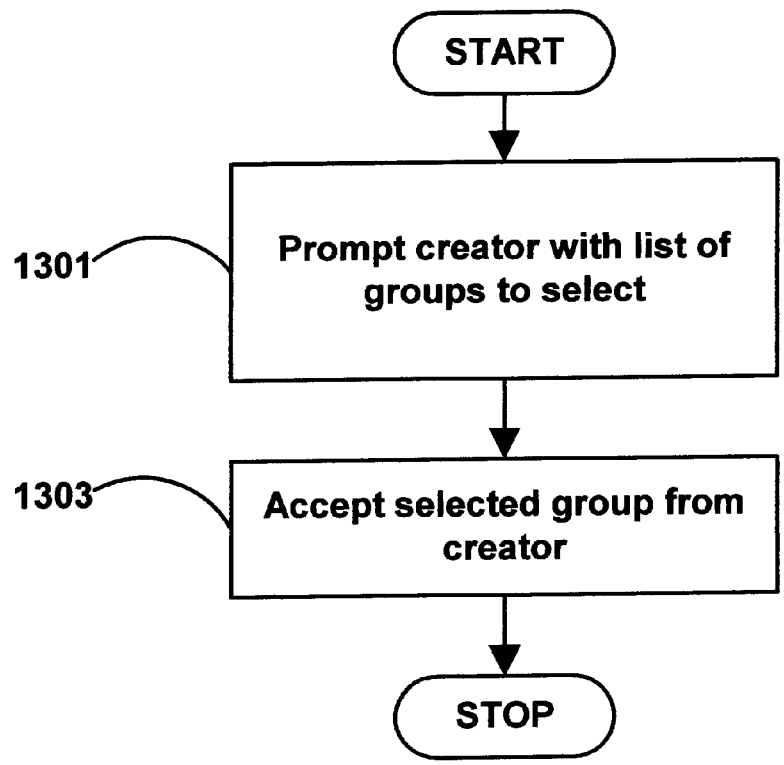
Figure 14:
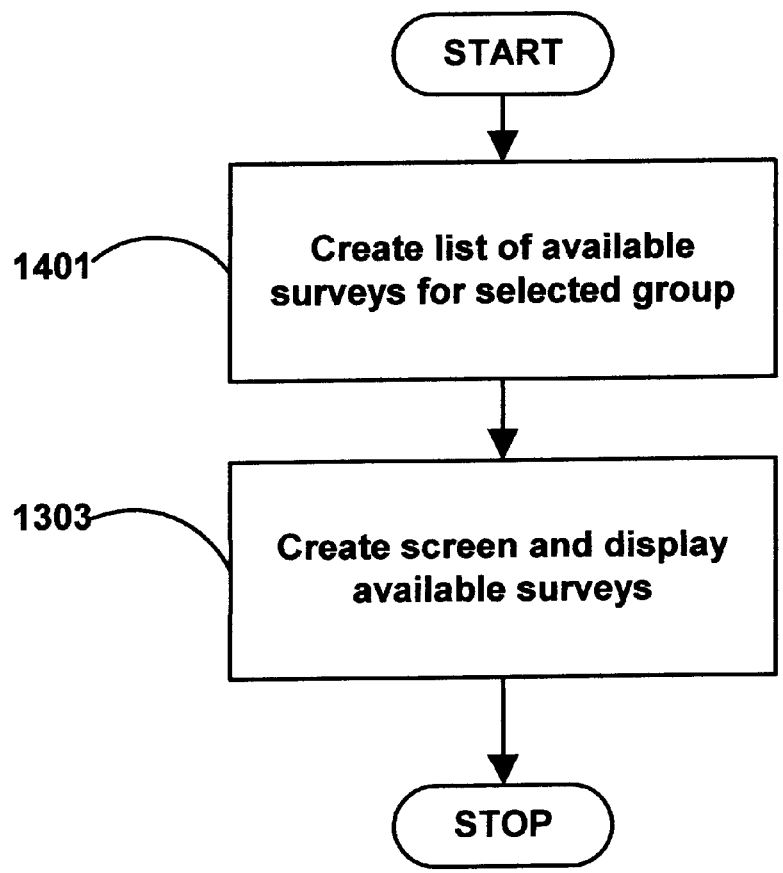
Figure 15:
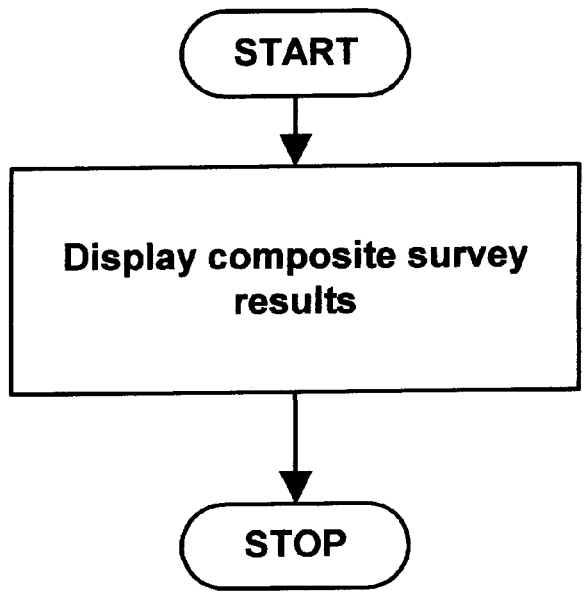

FIGS. 13–15 are flow diagrams that illustrate the script for reviewing survey results. Specifically, the Perl script prompts the reviewer of the survey to enter the authorized group identification number, block 1301, and the response is accepted for further processing, block 1303. Based on the response, the script, illustrated in FIG. 14, generates a Web page that presents a listing of surveys available for viewing, block 1401, and displays the list, block 1403. The data comprising the selected survey is accessed from table 600 (FIG. 6), and displayed in composite form, block 1501. The script performs the calculations such as summation, averages or counts.

With the present invention, it is possible to conduct surveys, such as economic surveys or political surveys which, for example, could poll users on whether the flat tax is favored or disfavored, and the results would be immediately determinable in real time by posting the data to a Web page. Advantageously, the webmaster is not required to program individual Perl script for each survey since the environment for automatically creating and posting the survey is provided.

Although not specifically disclosed herein, one skilled in the art will appreciate that the above survey tool may include interface screens implemented in the Java programming language (rather than Perl) to reduce complexity in creating the survey. Such screens may also contain screen buttons to pull down text boxes containing directions to guide the user through the survey. Further, it will be appreciated that additional features such as spell checkers or interactive, real-time question editors could be included with the survey tool, if desired, to create a more user friendly environment. Accordingly, once the webmaster sets up the environment, the creator need only enter the desired questions without need actual knowledge of the system, programming language or how the survey is generated.

In another preferred embodiment of the present invention, the survey tool is employed to construct a dynamic Web page that acts as an interface with server resident-relational databases for internet computers. It is to be understood that an internet computer is a low-cost, limited function computer that generally comprises a display, an input device such as a mouse or keyboard, an operating system resident in read only memory (ROM) or non-volatile memory such as flash memory or electrically erasable programmable read only memory (EEPROM), minimal random access memory (RAM) and a modem for establishing the internet connection. Internet computer does not include or require an expensive disk drive or other heavy mass storage devices.

Figure 16:
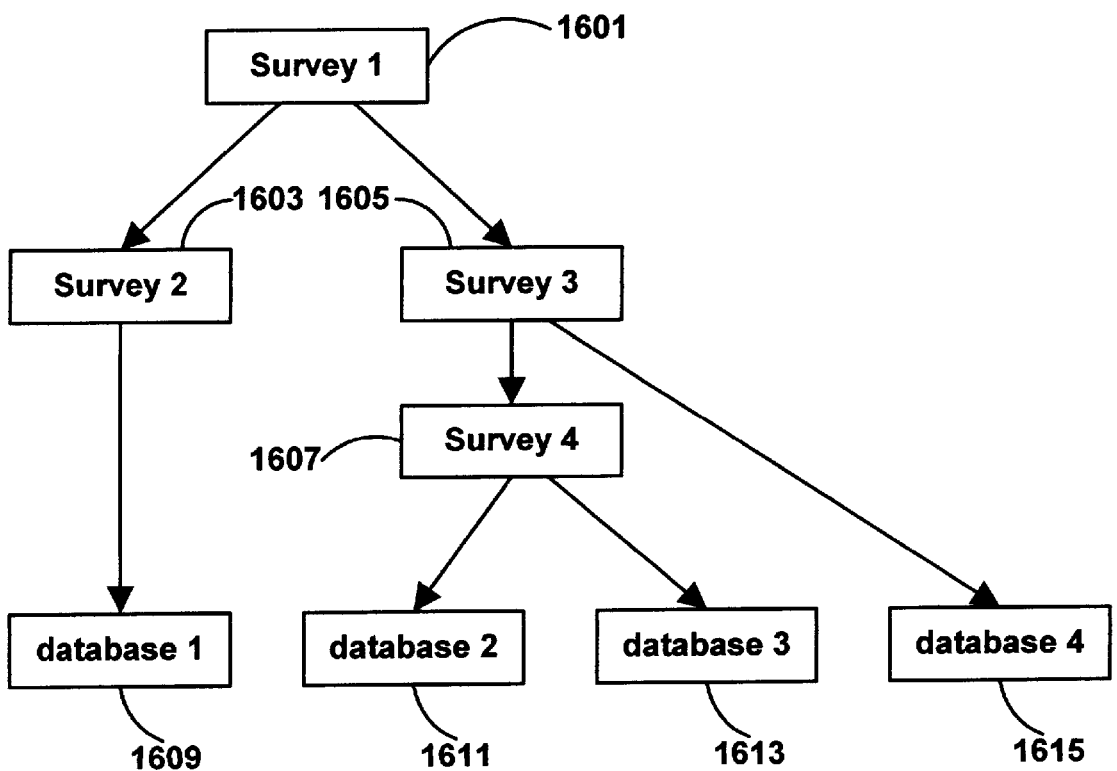
FIG. 16 illustrates a hypothetical survey decision tree.

Once connected to the Web page, a user of the internet computer may access one of a plurality of surveys to modify one or more relational database tables. Specifically, in a preferred embodiment of the present invention, the user is presented a series of questions on the display of internet computer after accessing the Web page. Based on the answers provided by the user, the appropriate table or tables are accessed or modified by Perl scripts resident on the computer 130 (FIG. 1). As will be appreciated by one skilled in the art, the present embodiment does not merely tabulate the response but rather provides the necessary intelligence, based on the answers given by the user to the first series of questions, for example Survey 1 as shown in FIG. 16. If necessary, secondary or tertiary series of questions from a decision tree comprising a plurality of surveys 1603–1607 may be further selected and displayed. Ultimately, based on responses to survey questions, Perl scripts select tables from databases 1609–1615 to be updated or accessed to generate information responsive to survey responses.

The present embodiment of the invention may be practiced in an industrial setting such as a warehouse or by sales people from a remote location where it is not practical to obtain a personal computer or it is undesirable to due to the expense to provide a laptop personal computer. In use, a telephone link is established between the internet computer and computer 130. The telephone link may either be over a wire or a cellular connection. Once the link is established, the user specifies the URL of the Web page and selects the desired survey from a list of options using the input device. By simply answering the questions of the survey, selected tables comprising a relational database may be accessed or even modified based on answers to the survey questions.

By way of example, airlines may create a Web page and interface scripts that interfaces with a relational database. When a user logs in to the web page, survey questions are designed to interpret the user's needs. For example, the first question may ask the country and city of origin of the desired flight so as to access database listing available flights. If the response is the United States, and the city is San Francisco, the domestic flight schedule tables (not shown) for the airports in the vicinity of San Francisco are accessed and a web page created to display such information. Once the desired flight, flight times and class of travel are displayed, a web page is created with available fares and purchase restrictions of the selected flight. The interface between the Web page and the relational database is provided by perl scripts, as discussed above. Since the user does not have direct access to the database, unauthorized data manipulation or corruption is prevented and the user is only provided relevant information mined from the accessed database.

Although not specifically disclosed herein, one skilled in the art will appreciate that the present invention may be easily adapted to interface with application software other than relational databases. Accordingly, the present invention provides a means for invoking application software from a computer, such as an internet computer, connected to said server by network connections. By answering a series of survey questions, the internet computer's user may select the desired application software and begin to instruct the application software to perform desired tasks over the internet since the scripts, resident on the server, interpret the answers and initiate the appropriate tasks. By presenting additional survey questions, the user is provided means for interfacing with the application or logging out of the application.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer system for performing a survey over a computer network, said computer network comprising a client computer coupled by a network link to a server computer, said computer system comprising:

a network server system disposed in said server computer;

a browser disposed in said client computer, said browser for accessing said network server system; and a dynamic survey system residing in said server system, said dynamic survey system adapted to allow users to construct survey questions for a plurality of surveys on said server system via said client computer, said dynamic survey system further adapted to present said survey over said network link, said dynamic survey system further adapted to enable said users to access results of said survey located on said server system using said client computer without requiring said client computer to have a second survey system disposed therein, said dynamic survey system adapted to provide a new survey from a decision tree having a plurality of available surveys if an appropriate response to a previously answered survey question is provided in a first survey.

2. The computer system for performing a survey over a computer network as recited in claim 1 wherein said network server system further comprises:

a web page.

3. The computer system for performing a survey over a computer network as recited in claim 1 wherein said network server system further comprises:

software scripts for generating a survey question on said network server system.

4. The computer system for performing a survey over a computer network as recited in claim 3 wherein said network server system is further adapted to enable said client computer to access said software script such that client computer is able to generate a survey question on said network server system without requiring said client computer to have a survey generation system disposed therein.

5. The computer system for performing a survey over a computer network as recited in claim 4 wherein said network server system further comprises:

an authorization system for selectively providing access to said software scripts such that only said client computer is able to generate a survey question on said network server system without requiring said selected client computer to have a survey generation system disposed therein.

6. The computer system for performing a survey over a computer network as recited in claim 1 wherein said network server system further comprises:

an authorization system for selectively providing access to said survey results such that only said client computer is able to access said survey results on said network server system without requiring said client computer to have a second survey system disposed therein.

7. The computer system for performing a survey over a computer network as recited in claim 1 wherein said network server system further comprises:

a relational database system adapted to tabulate said results to said survey presented by said survey system, such that said client computer is able to access relational database tabulated survey results without requiring said client computer to have a second relational database system disposed therein.

8. The computer system for performing a survey over a computer network as recited in claim 1 wherein said network server system is further adapted to enable said client computer to access survey results sent to said dynamic survey system from a second client computer.

9. A networked computer system having at least a first computer, said first computer having a CPU, a memory, a browser, a display device and an input device and a means for conducting an electronic survey on a network comprising:

an HTTP web server resident in the memory of said computer;

software scripts for generating at least one web page displayable by said HTTP web server, said Web page comprising a plurality of survey questions accessible by said browser; and a relational database application resident in the memory of said computer, said relational database application having a plurality of tables for storing a plurality of surveys, said electronic survey adapted to provide a new survey from a decision tree having a plurality of available surveys if an appropriate response to a previously answered survey question is provided in a first survey.

10. The networked computer system of claim 9 further comprising storing responses to said survey questions in said tables and for summarizing and presenting results of said responses to said questions.

11. The networked computer system of claim 9 further comprising a second computer, having a second CPU, a second memory, a second display device and a second input device, connected by a network connection to said first computer, said second computer further having a second browser resident in said second memory for accessing said Web page and for providing responses to said survey questions, said responses stored in at least one of said tables resident in the memory of said first computer.

12. The networked computer system of claim 11 further comprising means for selecting at least one of said tables and for transferring selected information stored in said tables to the display of said second computer without requiring said second computer to have a survey system disposed therein.

13. The networked computer system of claim 9, wherein said electronic survey is dynamically modified by adding at least one of said plurality of tables.

14. The networked computer system of claim 9, wherein said electronic survey is dynamically modified by modifying at least one of said plurality of tables.

15. A method for conducting a survey on the Internet comprising:

configuring a plurality of tables in a relational database environment;

populating at least one of said plurality of tables with survey questions in response to input from a client computer for a survey creator;

creating a Web page on a server computer for displaying the survey questions;

viewing the survey questions with a Web browser located on a client computer for a survey taker;

receiving input at said server computer to the survey questions via the Internet; and providing a new survey from a decision tree having a plurality of available surveys if an appropriate response to a previously answered survey question is provided in a first survey.

16. The method of claim 15 further comprising the steps of:

notifying users of the URL of said survey;

storing said input in at least a different one of said plurality of tables; and tabulating results of electronic surveys.

17. The method of claim 15 further comprising the steps of:

receiving further input responsive to a second set of survey questions from said new survey; and accessing one of said plurality of tables in response to said further input.

18. The method of claim 17 further comprising the step of modifying the data set contained in said table selected in response to said further input.

19. The method of claim 17 further comprising the step of transmitting at least a selected portion of the accessed table.

20. The method recited in claim 15, further comprising the steps of:

checking said survey questions for correct syntax; and prompting said survey creator to correct a survey question having an incorrect syntax.

21. The method recited in claim 15, further comprising the steps of:

discarding said input to said survey question if it is a null answer.

22. In a network system having a server with a memory and network connections, said server having application software, including a relational database, resident in the memory, a method for invoking said application software from a computer connected to said server by said network connections, said method comprising:

presenting a sequence of surveys, stored in said relational database;

receiving, via the network connection, input to said sequence of surveys;

analyzing said input; and responsive to said analysis of said input, invoking said application software to dynamically provide a new survey from a decision tree having a plurality of available surveys if an appropriate response to a previously answered survey question is provided in a first survey.

23. The method of claim 22 further comprising the steps of:

receiving, via the network connection, input to said second sequence of surveys;

analyzing said input; and responsive to said analysis of said input, initiating operational functions of said application software.

24. The method of claim 22 wherein said sequence of surveys is dynamically modified by adding an additional survey to said sequence of surveys.

25. The method of claim 22 wherein said sequence of surveys is dynamically modified by modifying at least one of said sequence of surveys.

* * * * *